United States Patent
Jelinek

(10) Patent No.: US 8,576,324 B2
(45) Date of Patent: Nov. 5, 2013

(54) IMAGE ACQUISITION SYSTEM USING ORTHOGONAL TRANSFER CCD SENSING ELEMENT

(75) Inventor: Jan Jelinek, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 919 days.

(21) Appl. No.: 12/699,368

(22) Filed: Feb. 3, 2010

(65) Prior Publication Data

US 2011/0187880 A1    Aug. 4, 2011

(51) Int. Cl.
- H04N 5/225 (2006.01)
- H04N 9/07 (2006.01)
- H04N 5/335 (2011.01)

(52) U.S. Cl.
USPC .................. 348/344; 348/339; 348/294

(58) Field of Classification Search
USPC ............. 348/208.1–208.13, 222.1, 264, 295, 348/294, 339, 344
See application file for complete search history.

(56) References Cited

U.S. PATENT DOCUMENTS

| | | | | |
|---|---|---|---|---|
| 3,833,762 | A * | 9/1974 | Gudmundsen | 348/208.99 |
| 4,382,267 | A * | 5/1983 | Angle | 348/298 |
| 5,331,365 | A | 7/1994 | Miyazawa et al. | |
| 5,859,892 | A * | 1/1999 | Dillen | 378/98.12 |
| 6,781,094 | B2 | 8/2004 | Harper | |
| 7,817,187 | B2 | 10/2010 | Silsby et al. | |
| 2001/0016053 | A1* | 8/2001 | Dickson et al. | 382/110 |
| 2002/0015094 | A1 | 2/2002 | Kuwano et al. | |
| 2011/0169960 | A1 | 7/2011 | Wagner | |

FOREIGN PATENT DOCUMENTS

| | | | |
|---|---|---|---|
| JP | 4-339476 A | | 11/1992 |
| JP | 2010-193324 | * | 2/2009 |
| JP | 2010-193324 A | | 9/2010 |

OTHER PUBLICATIONS

"Great Britain Application Serial No. GB1101401.6, Search Report dated May 26, 2011", 4 pgs.
"Iris Image Interchange Format", *ANSI standard INCITS m1/03-0590*, American National Standard for Information Technology, (No date listed).
"NoblePeak Technology—TriWave", http://www.noblepeak.com/Technology.html, Found at: htt://web.archive.org/web/20080518175441/http://www.noblepeak.com/Technology.html, (Archived copy from May 18, 2008)
"What is Optical Image Stabilizer?", http://www.canon.com/bctv/faq/optis.html, Canon, Inc., (2009).
Agrawal, A., et al., "Resolving Objects at Higher Resolution from a Single Motion-blurred Image", *IEEE Conference on Computer Vision and Pattern Recognition, 2007. CVPR '07.*, (2007), 1-8.

(Continued)

*Primary Examiner* — Tuan Ho
*Assistant Examiner* — Akshay Trehan
(74) *Attorney, Agent, or Firm* — Schwegman, Lundberg & Woessner, P.A.

(57) ABSTRACT

An image acquisition system that includes a first image recording device that records a series of images of a subject. A lateral velocity vector estimator receives the series of images from the first image recording device and estimates the lateral velocity vectors of the subject relative to the image acquisition system. The image acquisition system further includes a second image recording device that includes an orthogonal transfer CCD sensing element which records a target image of the subject. The orthogonal transfer CCD sensing element includes an array of pixels. A control adjusts the array of pixels within the orthogonal transfer CCD sensing element based on the lateral velocity vector estimates provided by the lateral velocity estimator.

19 Claims, 3 Drawing Sheets

(56) References Cited

OTHER PUBLICATIONS

Platt, B. C, et al., "History and Principles of Shack-Hartmann Wavefront Sensing", *Journal of Refractive Surgery*, 17, (Sep./Oct. 2001), S573-S577.

Raskar, R., et al., "Coded exposure photography: motion deblurring using fluttered shutter", *International Conference on Computer Graphics and Interactive Techniques, ACM SIGGRAPH 2006 Papers*, (2006), 795-804.

Tonry, John L, et al., "The Orthogonal Transfer CCD", http://xxx.lanl.gov/abs/astro-ph/9705165, (May 21, 1997), 21 pgs.

Tonry, John L., et al., "The Orthogonal Transfer CCD", *Experimental Astronomy*, 8(1), (Mar. 1998), 77-87.

"U.S. Appl. No. 13/039,932, Non Final Office Action mailed Jun. 21, 2013", 12 pgs.

\* cited by examiner

IMAGE ACQUISITION SYSTEM USING ORTHOGONAL TRANSFER CCD SENSING ELEMENT

GOVERNMENT RIGHTS

This invention was made with Government support under Contract Number: W911NF-10-C-0022 by IARPA. The Government has certain rights in the invention.

BACKGROUND

A conventional approach to acquiring high quality iris or face images of moving subjects is to freeze the subject motion by using extremely short exposures. The subject must be brightly illuminated by a flash in order to get a well exposed image. This approach commonly breaks down for larger distances because the flash power that is required in order to obtain an acceptable image often becomes eye unsafe.

Producing a well exposed image without flash illumination typically requires extending the image exposure, which degrades the image quality. One drawback with this approach is extending the image exposure typically introduces motion blur unless the relative motion between the subject and the camera sensor is eliminated.

The motion of a subject relative to the camera sensor can be real, apparent or both. Real motion is the result of the physical motion of the subject and/or the sensor. Real motion is described by a velocity vector, v(t), which gets decomposed into two components. The axial velocity vector points toward the sensor and is aligned with the optical axis of the sensor. The lateral velocity vector is the velocity vector projection into an X-Y plane perpendicular to the optical axis. Axial velocity affects the focusing of camera optics and may introduce magnification blur for long exposures. Lateral velocity causes motion blur.

Existing systems attempt to estimate the velocity vectors and then move items within the camera in order to compensate for axial and lateral motion of the subject relative to the camera. Moveable lenses are widely used as image stabilizing elements in cameras. One known approach is to use a pair of inertial sensors to detect camera relative motion between a subject and the camera and then move the stabilization lens to compensate for the relative motion. An alternative approach employs a tip-tilt minor to compensate for the relative motion.

One drawback with these types of solutions is that they typically cannot track very fast motions. In addition, these approaches usually utilize delicate mechanical parts that make their use problematic in military and security applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
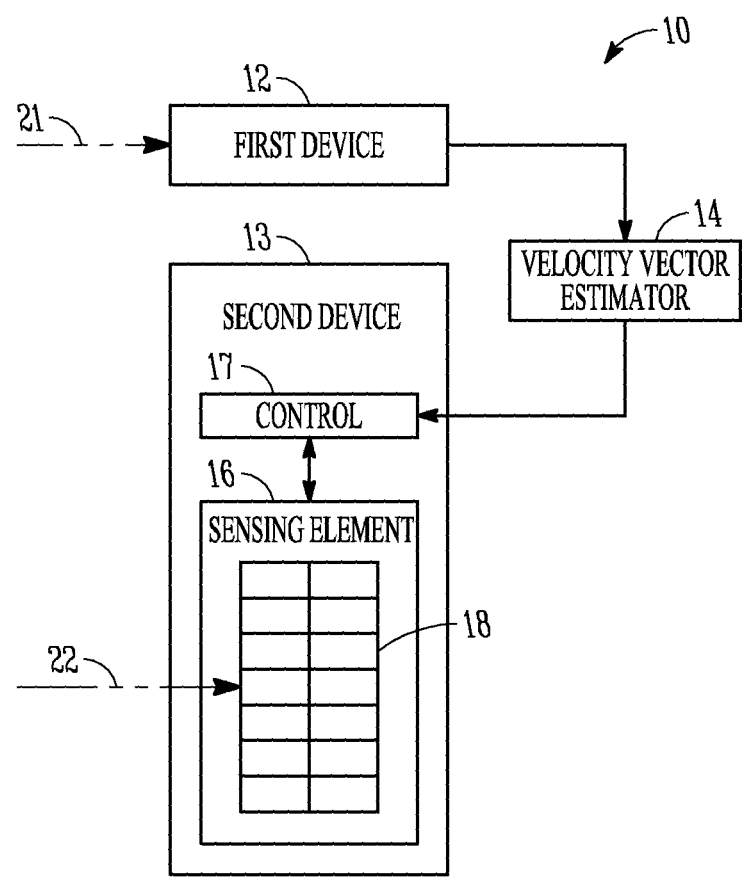
FIG. 1 illustrates an example image acquisition system.

FIG. 1 illustrates an example image acquisition system 10. The example image acquisition system 10 includes a first image recording device 12 that records a series of images of a subject. The example image acquisition system 10 further includes a lateral velocity vector estimator 14 that receives the series of images from the first image recording device 12 and estimates the lateral velocity vectors of the subject relative to the image acquisition system 10.

The example image acquisition system 10 further includes a second image recording device 13. The second image recording device 13 includes an orthogonal transfer CCD sensing element 16 which records a target image of the subject. The orthogonal transfer CCD sensing element 16 includes an array of pixels 18 that captures the target image.

The image acquisition system 10 further includes a control 17 that adjusts the array of pixels 18 within the orthogonal transfer CCD sensing element 16. The control 17 makes adjustments to the array of pixels 18 based on the lateral velocity vector estimates provided by the lateral velocity estimator 14.

In some embodiments, the first image recording device 12 is a camera although it should be noted that the first image recording device 12 may be any device that is capable of sending a series of images of the subject to the lateral velocity estimator 14. In other embodiments, the first image recording device 12 may be a scanning laser/range finder that is capable of determining the distance from the subject to the image acquisition system 10 and measuring the velocity vector of the subject relative to the image acquisition system 10 in real time.

The lateral velocity estimator 14 may be any device that is capable of receiving a series of images of the subject from the first image recording device 12. As examples, the lateral velocity estimator 14 may use range data from a scanning laser range finder, or depth images from a camera whose sensor has pixels capable of real time time-of-flight ranging.

Depending on the application where the image acquisition system 10 is utilized, the lateral velocity vector estimator 14 may receive the series of images from the first image recording device 12 before the second image recording device 13 records the target image of the subject. In other embodiments, the lateral velocity vector estimator 14 may receive the series of images from the first image recording device 12 while the second image recording device 13 records the target image of the subject. The image acquisition system 10 may include closed loop control such that estimates are applied immediately after they are computed (i.e., in real time). The rate of updates will be dictated by the frame rate of first image recording device 12. In addition, the number of updates may be the same as the number of images in the series of images.

In some embodiments, the second image recording device 13 is a camera although it should be noted that the second image recording device 13 may be any device that is capable of recording a target image of the subject onto an orthogonal transfer CCD sensing element 16. Using an Orthogonal Transfer CCD sensor element 16 as the image stabilizing element improves performance of the image acquisition system 10 because unlike other known implementations of the image stabilization concept, Orthogonal Transfer CCD sensor element 16 involves no moveable mechanical parts (e.g., lenses, minors or sensor chips). The orthogonal transfer CCD sensor element 16 moves the potential wells that correspond to the array of pixels 18 accumulate their photoelectrons. Since the wells do not have any inertia, the wells can be moved extremely fast by manipulating in real time the voltages that define orthogonal transfer CCD sensor element 16 operation. With no moveable mechanical parts, the orthogonal transfer CCD sensor element 16 offers an extremely rugged solution that is well suited for security and military applications.

The orthogonal transfer CCD sensor element 16 offers an appealing alternative to mechanically delicate tip-tilt mirrors and moveable stabilizing lenses. The orthogonal transfer CCD sensor element 16 stabilizes the image not by mechanically reconfiguring the optics or moving the sensing chip, but rather by electronically changing the location of the orthogonal transfer CCD sensor element 16 array of pixels 18.

Since the image acquisition system 10 employs an image stabilization concept, the image acquisition system 10 needs to estimate the relative velocity between the subject and the image acquisition system 10 in order to properly drive the orthogonal transfer CCD sensor element 16. The velocity vector can be estimated before or during the image exposure. Estimating the velocity vector before the image exposure is limited to simpler scenarios involving only physical motion of the subject. The series of images provided to the lateral velocity vector estimator 14 during the image exposure is evaluated to determine the velocity vector. The velocity vector is then used to drive in real time the potential well movements in the orthogonal transfer CCD sensor element 16.

The controller 17 may issue updates to the orthogonal transfer CCD sensor element 16 at rates on the order of 100 updates/sec. The update can include calls for shifting the pixels in the array of pixels 18.

In some embodiments, the orthogonal transfer CCD sensor element 16 may be capable of executing array shifts at rates on the order of 100,000 updates/sec. However, the orthogonal transfer CCD sensor element 16 may only be able to execute single step shifts (i.e., one pixel left, right or none and/or one pixel up, down or none).

The rate mismatch between obtaining updates and shifting pixels may provide the possibility of implementing the orthogonal transfer CCD sensor element 16 as an 0th order, 1st order (or even higher) converter. The operation between the controller 17 and orthogonal transfer CCD sensor element 16 may involve interpolation defining what is to be output between controller updates. As examples, the polynomial interpolation may be 0th order (piecewise constant—see FIG. 3), 1st order (linear—see FIG. 4), 2nd order (quadratic) or even higher.

Figure 3:
FIG. 3 illustrates an example piecewise interpolation that may be used to provide updates for pixel shifts in an array within an orthogonal transfer CCD sensing element.
Figure 4:
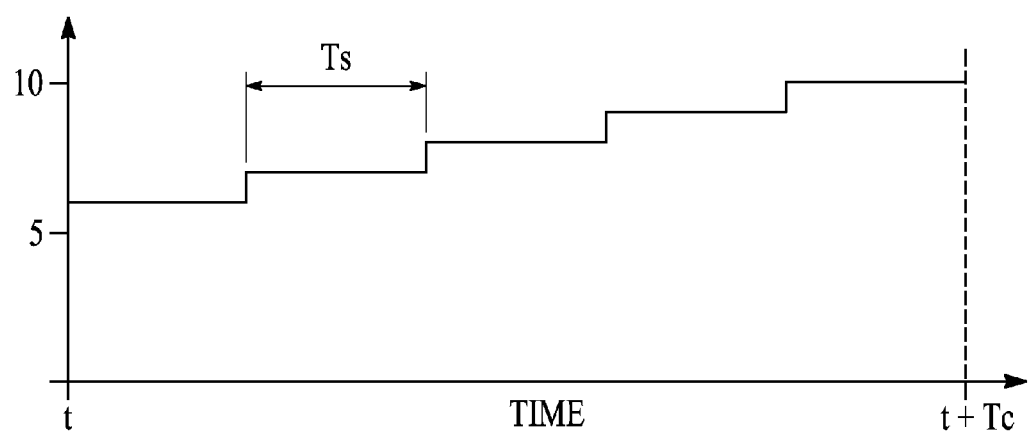
FIG. 4 illustrates an example linear interpolation that may be used to provide updates for pixel shifts in an array within an orthogonal transfer CCD sensing element.

In the examples illustrated in FIGS. 3 and 4, Tc is the period at which the controller sends its updates to the orthogonal transfer CCD sensor element 16. This period is fixed by design and does not depend on data being processed. In addition, Ts is the period at which the orthogonal transfer CCD sensor element 16 sends commands to the array of pixels 18.

As shown in FIG. 3, when using piecewise interpolation, Ts is equal to the shortest shift time the orthogonal transfer CCD sensor element 16 can handle. As shown in FIG. 4, when using linear and higher interpolation orders, Ts depends on the length of the shift requested by the controller 17 (the shift is 5 pixels in the example diagrams). The orthogonal transfer CCD sensor element 16 calculates Ts so as to evenly (in the case of linear interpolation) distribute the single step shifts within Tc to make the rise smooth.

In the example embodiment illustrated in FIG. 1, the first image recording device 12 and the second image recording device 13 record their respective images along different optical paths 21, 22 from the subject. The first image recording device 12 records the series of images of the subject along a first optical path 21 and the second image recording device 13 records images along a different second optical path 22.

Figure 2:
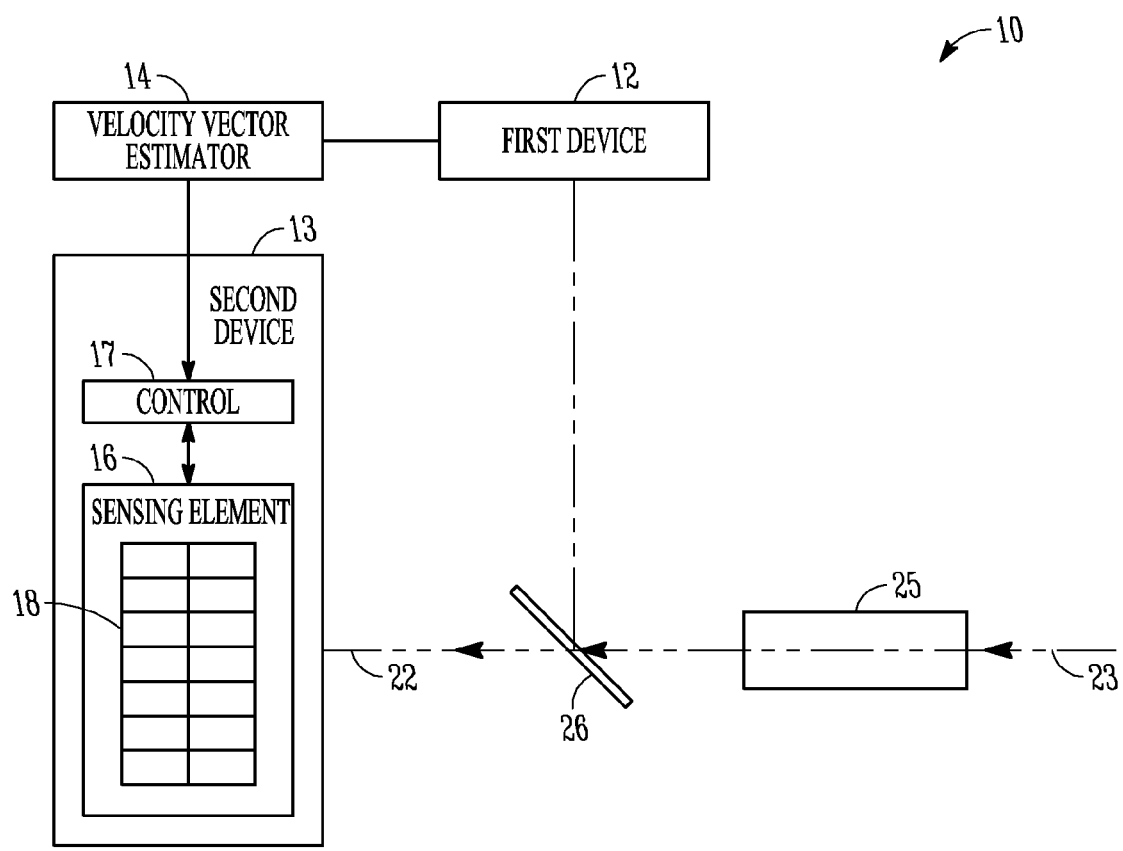
FIG. 2 illustrates another example image acquisition system.

FIG. 2 shows an example embodiment where the first image recording device 12 and the second image recording device 13 at least partially record their respective images along the same optical path 23 from the subject. In the example embodiment that is illustrated in FIG. 2, the light travels along common optical path 23 through a common lens 25 before the light is split using a splitter 26. Once the light is split, some light travels along optical path 21 to the first image recording device 12 and some light travels along optical path 22 to the second image recording device 13.

Depending on the hardware that used in the image acquisition system 10, the first image recording device 12 and the second image recording device 13 may record light at different, the same or overlapping wavelengths. In the example embodiment that is illustrated in FIG. 2, the splitter 26 directs light having wavelengths in the visible range of the spectrum to the first image recording device 12 and directs light in the near infrared range of the spectrum to the second image recording device 13.

An example method of obtaining a target image of a subject will now be described with reference to FIGS. 1 and 2. The method includes recording a series of images of the subject using an image acquisition system 10 and estimating lateral velocity vectors of the subject relative to the image acquisition system 10. The method further includes recording a target image of the subject onto an array of pixels that form part of an orthogonal transfer CCD sensing element within the image acquisition system and adjusting the array of pixels based on the estimated lateral velocity vectors.

In some embodiments, recording a series of images of the subject may include recording a series of images of the subject using a first device 12, and recording the target image of the subject may include recording the target image of the subject with a second device 13. In addition, recording a series of images of the subject using a first device 12 may includes recording the series of images along a different (FIG. 1), similar (FIG. 2) or identical optical path to recording of the target image of the subject with the second device 13.

It should be noted that recording a series of images of the subject using a first device 12 may include recording the series of images in a spectral range that is different, overlapping or identical to the spectral range where the target image of the subject is recorded with the second device 13.

In some embodiments, recording a series of images of the subject using an image acquisition system 10 may be done before recording the target image of the subject onto an array of pixels 18 and even estimating lateral velocity vectors of the subject relative to the image acquisition system 10 may be done before recording the target image of the subject onto an array of pixels 18.

In other embodiments, recording a series of images of the subject using an image acquisition system 10 may be done while recording the target image of the subject onto an array of pixels 18. In addition, estimating lateral velocity vectors of the subject relative to the image acquisition system 10 may be done while recording the target image of the subject onto the array of pixels 18.

The image acquisition system 10 described herein may be used to consistently produce high-quality iris and/or face images of moving, uncooperative subjects at larger distances, where the use of a flash to freeze the motion is difficult because of eye safety concerns. The image acquisition system 10 may be used to produce a well exposed image (without flash illumination) by extending the image exposure without degrading the image quality. The image acquisition system 10 is able to extend the image exposure without introducing the motion blur by using the Orthogonal Transfer CCD sensor element 16 as the image stabilizing element.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An image acquisition system comprising:
    a first image recording device that records a series of images of a subject;
    a lateral velocity vector estimator that receives the series of images from the first image recording device and estimates the lateral velocity vectors of the subject relative to the image acquisition system; and
    a second image recording device that includes an orthogonal transfer CCD sensing element which records a target image of the subject, the orthogonal transfer CCD sensing element including an array of pixels;
    a control that adjusts the array of pixels within the orthogonal transfer CCD sensing element based on the lateral velocity vector estimates provided by the lateral velocity estimator, wherein the control adjusts the array of pixels in single step shifts and multiple step shifts depending on the estimates of the lateral velocity vector of the subject relative to the image acquisition system.

2. The system of claim 1 wherein the first image recording device and the second image recording device share part of an optical path from the subject.

3. The system of claim 1 wherein the first image recording device and the second image recording device have different optical path from the subject.

4. The system of claim 1 wherein the first image recording device and the second image recording device record light at different wavelengths.

5. The system of claim 1 wherein the first image recording device and the second image recording device record light at the same wavelengths.

6. The system of claim 1 wherein the first image recording device is a camera.

7. The system of claim 1 wherein the second image recording device is a camera.

8. The system of claim 1 wherein the lateral velocity vector estimator receives the series of images from the first image recording device before the second image recording device records the target image of the subject.

9. The system of claim 1 wherein the lateral velocity vector estimator receives the series of images from the first image recording device while the second image recording device records the target image of the subject.

10. The system of claim 1 wherein the first image recording device and the second image recording device share part of an optical path from the subject, and wherein the first image recording device and the second image recording device record light at different wavelengths.

11. A method of obtaining a target image of a subject comprising:
    recording a series of images of the subject using a first image recording device;
    estimating lateral velocity vectors of the subject relative to the image acquisition system using the series of images recorded from the first image recording device;
    recording the target image of the subject with a second image recording device onto an array of pixels that form part of an orthogonal transfer CCD sensing element within the image acquisition system; and
    adjusting the array of pixels in single step shifts and multiple step shifts depending on the estimates of the lateral velocity vector of the subject relative to the image acquisition system.

12. The method of claim 11 wherein recording a series of images of the subject using a first device includes recording the series of images along an optical path, and wherein recording the target image of the subject with a second device includes recording the target image of the subject along the optical path.

13. The method of claim 11 wherein recording a series of images of the subject using a first device includes recording the series of images along an optical path, and wherein recording the target image of the subject with a second device includes recording the target image of the subject along a different optical path.

14. The method of claim 11 wherein recording a series of images of the subject using a first device includes recording the series of images in a spectral range, and wherein recording the target image of the subject with a second device includes recording the target image of the subject in the spectral range.

15. The method of claim 11 wherein recording a series of images of the subject using a first device includes recording the series of images in a spectral range, and wherein recording the target image of the subject with a second device includes recording the target image of the subject in a different spectral range.

16. The method of claim 11 wherein recording a series of images of the subject using an image acquisition system is done before recording the target image of the subject onto an array of pixels.

17. The method of claim 11 wherein estimating lateral velocity vectors of the subject relative to the image acquisition system is done before recording the target image of the subject onto an array of pixels.

18. The method of claim 11 wherein recording a series of images of the subject using an image acquisition system is done while recording the target image of the subject onto an array of pixels.

19. The method of claim 11 wherein estimating lateral velocity vectors of the subject relative to the image acquisition system is done while recording the target image of the subject onto an array of pixels.

* * * * *